US010235246B2

(12) United States Patent
Chen et al.

(10) Patent No.: US 10,235,246 B2
(45) Date of Patent: *Mar. 19, 2019

(54) DATA SYNCHRONIZATION OF BLOCK-LEVEL BACKUP

(71) Applicant: International Business Machines Corporation, Armonk, NY (US)

(72) Inventors: Wen Qing Chen, Beijing (CN); Ya Jie Li, Beijing (CN); Hang Xiao, Beijing (CN); Ming Yan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/416,397

(22) Filed: Jan. 26, 2017

(65) Prior Publication Data

US 2017/0139602 A1 May 18, 2017

Related U.S. Application Data

(63) Continuation of application No. 14/919,046, filed on Oct. 21, 2015, now Pat. No. 9,619,333, which is a continuation of application No. 14/658,268, filed on Mar. 16, 2015, now Pat. No. 9,626,250.

(51) Int. Cl.
*G06F 11/14* (2006.01)
*G06F 3/06* (2006.01)

(52) U.S. Cl.
CPC .......... *G06F 11/1451* (2013.01); *G06F 3/061* (2013.01); *G06F 3/065* (2013.01); *G06F 3/067* (2013.01); *G06F 3/0659* (2013.01); *G06F 3/0689* (2013.01); *G06F 11/1464* (2013.01); *G06F 2201/84* (2013.01)

(58) Field of Classification Search
CPC ............. G06F 11/1448; G06F 11/1451; G06F 11/1458; G06F 11/1461; G06F 11/1464; G06F 11/1471; G06F 11/1474; G06F 2201/84
USPC ....................................................... 711/162
See application file for complete search history.

(56) References Cited

U.S. PATENT DOCUMENTS 6,959,313 B2   10/2005   Kapoor et al.
7,010,553 B2   3/2006    Chen et al.
7,779,296 B2   8/2010    Urmston
(Continued)

FOREIGN PATENT DOCUMENTS

CN       103761159 A       4/2014

OTHER PUBLICATIONS

IBM, "Tivoli Storage Manager for z/OS 5.5.0", IBM Knowledge Center, noted by Inventor in Post Disclosure dated Nov. 21, 2014, <http://www-01.ibm.com/support/knowledgecenter/SSAVT2_5.5.0/KC_ditamaps/product_welcome.html>.
Lu et al., "An Incremental File System Consistency Checker for Block-Level CDP Systems", Symposium on Reliable Distributed Systems, pp. 157-162, © 2008 IEEE, DOI 10.1109/SRDS.2008.20.
(Continued)

*Primary Examiner* — Joseph R Kudirka
(74) *Attorney, Agent, or Firm* — Daniel R. Simek

(57) ABSTRACT

As disclosed herein, a method for optimizing data synchronization when performing a block-level backup includes receiving a customized merging plan, and creating a padding map that includes missing data information, and sending the padding map to a local backup server to request missing data. The method further includes receiving from the local backup server the missing data, and performing a snapshot consolidation according to the customized merging plan to provide a consolidated snapshot.

6 Claims, 11 Drawing Sheets

(56) References Cited

U.S. PATENT DOCUMENTS

| | | |
|---|---|---|
| 7,900,088 B1 | 3/2011 | Pawar et al. |
| 8,060,713 B1 | 11/2011 | Natanzon |
| 8,286,030 B1 | 10/2012 | Chatterjee et al. |
| 9,043,567 B1 | 5/2015 | Modukuri et al. |
| 9,146,685 B2 | 9/2015 | Goldberg et al. |
| 2006/0161810 A1 | 7/2006 | Bao |
| 2008/0307175 A1 | 12/2008 | Hart et al. |
| 2010/0179941 A1 | 7/2010 | Agrawal et al. |
| 2012/0173656 A1 | 7/2012 | Sorenson, III |
| 2012/0197844 A1 | 8/2012 | Wang et al. |
| 2013/0159646 A1 | 6/2013 | Atzmon et al. |
| 2014/0095823 A1 | 4/2014 | Shaikh et al. |
| 2014/0181051 A1 | 6/2014 | Montulli et al. |
| 2014/0195748 A1 | 7/2014 | Bashyam et al. |
| 2015/0081993 A1 | 3/2015 | Christopher et al. |

OTHER PUBLICATIONS

Lu et al., "Scalable Index Update for Block-Level Continuous Data Protection", 2011 Sixth IEEE International Conference on Networking, Architecture, and Storage, pp. 372-381, © 2011 IEEE, DOI 10.1109/NAS.2011.54.

Chen et al., "Data Synchronization of Block-Level Backup", U.S. Appl. No. 14/658,268, filed Mar. 16, 2015, 46 pages.

Chen et al., "Data Synchronization of Block-Level Backup", U.S. Appl. No. 14/919,046, filed Oct. 21, 2015, 43 pages.

Chen et al., "Data Synchronization of Block-Level Backup", U.S. Appl. No. 15/416,314, filed Jan. 26, 2017, 43 pages.

Chen et al., "Data Synchronization of Block-Level Backup", U.S. Appl. No. 15/416,365, filed Jan. 26, 2017, 43 pages.

Chen et al., "Data Synchronization of Block-Level Backup", U.S. Appl. No. 15/416,458, filed Jan. 26, 2017, 42 pages.

IBM Appendix P, list of IBM patents and patent applications treated as related, Jan. 26, 2017, 2 pages.

1000

```
        //When all blocks in a data file come from the same snapshot, this data file can be
1010a   renamed
        RenameFile(srcSnapshot a, srcFile_# , targetSnapshot j, targetFile_#);
1010b   ...
        RenameFile(srcSnapshot j-1, srcFile_# , targetSnapshot j, targetFile_#);

1020a   //copy block from source snapshot to the target snapshot
        CopyBlock(srcSnapshot a, srcFile_#, blockID, targetSnapshot j, targetFile_#,
        blockID);
1020b   ...
        CopyBlock(srcSnapshot j-1, srcFile_#, blockID, targetSnapshot j, targetFile_#,
        blockID);

//References to the expired snapshots are updated to refer to the consolidated full
1030a   snapshot
        ModifyReference(snapshot j+1, consolidatedFullSnapshot j);
1030b   ...
        ModifyReference(snapshot n, consolidatedFullSnapshot j);

1040a   //Delete all files for the snapshots that have been consolidated
        DeleteFile(snapshot a, file_#);
1040b   ...
        DeleteFile(snapshot j-1, file_#);
```

FIG. 10

DATA SYNCHRONIZATION OF BLOCK-LEVEL BACKUP

BACKGROUND OF THE INVENTION

The present invention relates generally to the field of data backup, and more particularly to optimizing data synchronization when performing a block-level disaster recovery backup.

Backing up digital data stored on individual computer devices is often conducted to preserve information important to companies and individuals. The data is often stored on a hard disk and accessed via a file system. The file system may be responsible for keeping track of the hierarchy of files on the hard disk, and where, on the hard disk, the data blocks corresponding to each file are located. Some backup applications that perform file level backups may use the file system to obtain the data that is being backed up.

A block-level backup application reads data blocks directly from the disk in the order the data blocks appear on the disk, without looking at the file system. Block-level backup applications may read data from the disk using fixed size data blocks, and the fixed size data blocks may be a different size than the file system data blocks. The block-level backup application never looks at the files, so the number of files on the hard disk, or the physically random locations of data blocks corresponding to a file on the hard disk has no effect on the performance of the block-level backup application. Additionally, block-level backup algorithms may use snapshots (a view of the data at a specific point in time) to reduce the quantity of data required to be backed up during each backup operation. The first snapshot may include a full backup, while each subsequent backup may be an incremental backup (i.e., the snapshot only includes data that has changed since the most recent snapshot was obtained).

SUMMARY

As disclosed herein, a method for optimizing data synchronization when performing a block-level backup includes receiving a customized merging plan, and creating a padding map that includes missing data information, and sending the padding map to a local backup server to request missing data. The method further includes receiving from the local backup server the missing data, and performing a snapshot consolidation according to the customized merging plan to provide a consolidated snapshot.

As disclosed herein a method for optimizing data synchronization when performing a block-level backup includes receiving a request to initiate a snapshot consolidation of expired snapshots. The method further includes parsing expired snapshot control files and data files to provide a customized merging plan including commands to perform the snapshot consolidation, and sending the customized merging plan to a disaster recovery server. The method further includes receiving from the disaster recovery server a padding map that indicates missing data, and sending the indicated missing data to the disaster recovery server.

BRIEF DESCRIPTION OF THE DRAWINGS

FIG. 10 is a diagram depicting one example of a merging plan, in accordance with an embodiment of the present invention.

DETAILED DESCRIPTION

In today's high tech society, many day-to-day activities are highly dependent on computerized networks or environments. Computers operating in an environment may contain large quantities of vital information (i.e., data) stored on a local hard disk. It is a common practice to maintain periodic backup copies of the vital information to avoid unrecoverable loss of the data. When performing data backups, one or more computers may be periodically backed up to a local backup server. The local backup server may have one or more very large hard disks (e.g., one terabyte capacity) allowing the local backup server to maintain many snapshots of back up data.

A snapshot may be a copy of data stored on persistent storage at a specific point in time. Contained within the snapshot may be one or more control files, one or more data files, and data blocks. A data block may be a portion of data (of predefined size) from the persistent storage. A data file may comprise a plurality of data blocks corresponding to consecutive blocks of data on the persistent storage. There may be one control block corresponding to each data file. The control block may contain information that identifies which snapshot (e.g., the current snapshot, or a specific subsequent snapshot) contains the most recent copy of data corresponding to each data block within the data file.

To further protect against greater data loss, perhaps due to a natural disaster, the local backup server may also be backed up to a disaster recovery server. In some embodiments, for performance reasons, the local backup server and the backup clients may be physically located near each other and communicate with each other via a local area network (LAN) The disaster recovery server may be remotely located and connected to the local backup server via a network connection (e.g., a WAN).

Using a predetermined schedule, the contents of the local server may be backed up to the disaster recovery server. The method of backup between the local backup server and the disaster recovery server may be block-level backup. A block-level backup may bypass the file system and read data directly from the hard disk. To perform a full snapshot backup, the local backup server may transmit, over a network, data blocks to the disaster recovery server. It has been observed, given possible limits in network bandwidth and the typical large size of disk drives being backed up, it is difficult to synchronize data of a consolidated full snapshot from a local backup server to a disaster recovery server over the network (e.g. WAN). The embodiments disclosed herein provide a method for optimizing data synchronization when performing a block-level disaster recovery backup.

Figure 1:
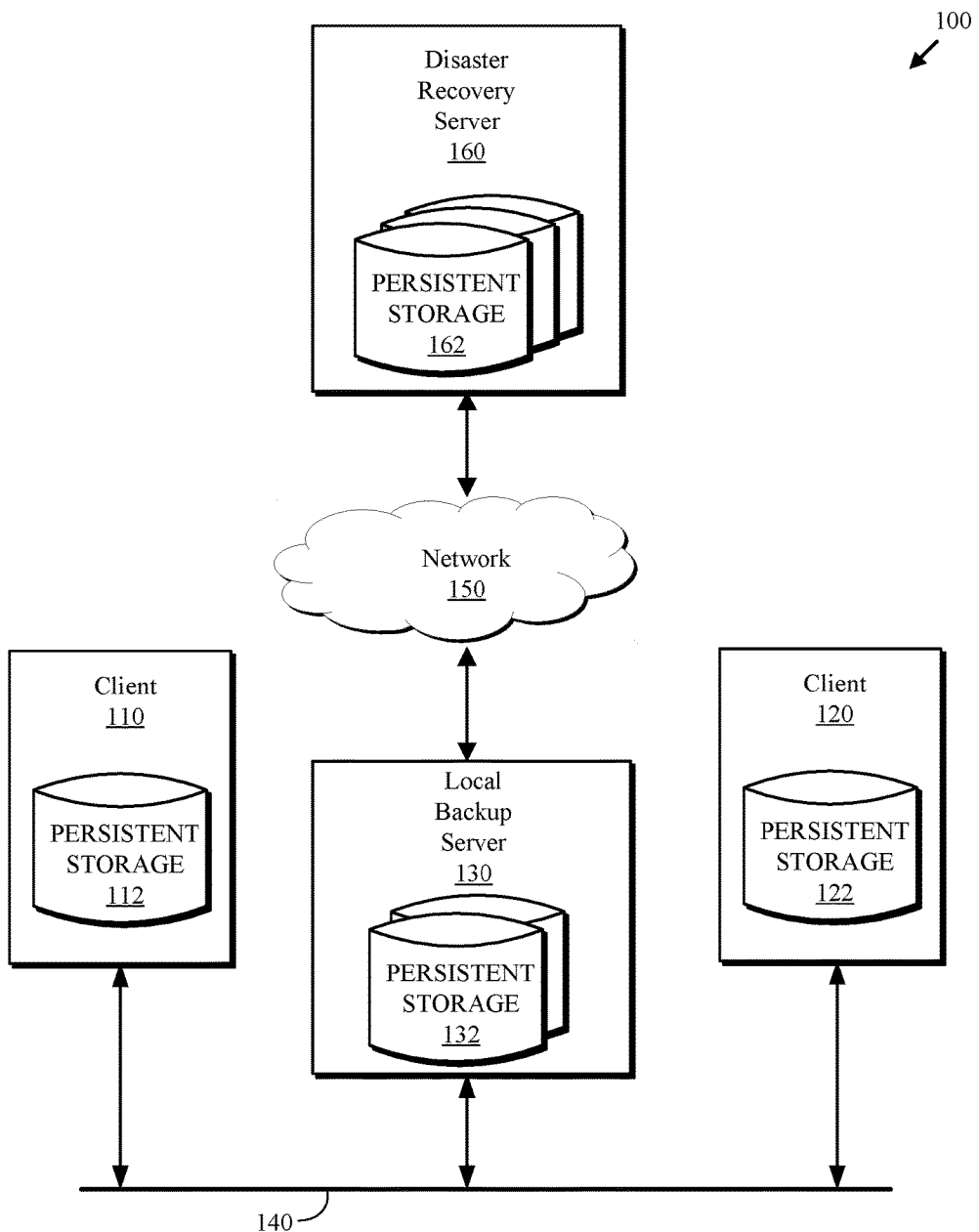
FIG. 1 is a functional block diagram of one embodiment of a distributed data processing environment in which at least some of the embodiments disclosed herein may be deployed.

FIG. 1 is a functional block diagram of one embodiment of a distributed data processing environment 100. As depicted, distributed data processing environment 100 includes client computing devices 110 and 120, local backup server 130, local network 140, network 150, and disaster recovery server 160. Distributed data processing environment 100 is one example of an environment in which at least some of the embodiments disclosed herein may be deployed.

Each of client computing devices 110 and 120 may be a desktop computer, a laptop computer, a tablet computer, a specialized computer server, a smart phone, or any programmable electronic device capable of communicating with various components and devices within distributed data processing environment 100, via local network 140. Local backup server 130 and/or disaster recovery server 160 can be a standalone computing device, a management server, a web server, a mobile computing device, or any other electronic device or computing system capable of receiving, sending, and processing data. In other embodiments, local backup server 130 and disaster recovery server 160 can represent a server computing system utilizing multiple computers as a server system, such as in a cloud computing environment.

As depicted, client computing devices 110 and 120, local backup server 130 and disaster recovery server 160 each have persistent storage (i.e. 112, 122, 132, and 162). Persistent storage (112, 122, 132, and 162) can be, for example, a magnetic hard drive, solid state drive, storage area network (SAN), network attached storage (NAS), or cloud storage. Local backup server 130 may be a server capable of receiving and storing, on persistent storage 132, backup data from one or more clients (e.g., client computing devices 110 and 120). In some embodiments, the backup data corresponding to client computing device 110 includes a full snapshot of data from persistent storage 112. In other embodiments, the backup data corresponding to client computing device 110 includes an incremental snapshot (i.e., only data that has changed since a previous backup) from persistent storage 112. In the event that a client must recover data, local backup server 130 may also provide data to clients. Client computing devices 110 and 120 and local backup server 130 may be connected to local network 140.

Disaster recovery server 160 may be a server capable of receiving and storing, on persistent storage 162, backup data corresponding to local backup server 130. In some embodiments, the backup data corresponding to local backup server 130 includes a full snapshot of data from persistent storage 132, and is stored on persistent storage 162. In other embodiments, the backup data corresponding to local backup server 130 includes an incremental snapshot (i.e., only data that has changed since a previous backup) from persistent storage 132, and is stored on persistent storage 162. Disaster recovery server 160 and local backup server 130 may be capable of communicating with each other via network 150.

Network 150 can be, for example, a telecommunications network, a wide area network (WAN), such as the Internet, or a combination of the two, and can include wired, wireless, or fiber optic connections. Network 150 can include one or more wired and/or wireless networks that are capable of receiving and transmitting data, voice, and/or video signals, including multimedia signals that include voice, data, and video information. In general, network 150 can be any combination of connections and protocols that support communication between local backup server 130, disaster recovery server 160, and other computing devices (not shown) within distributed data processing environment 100.

Figure 2:
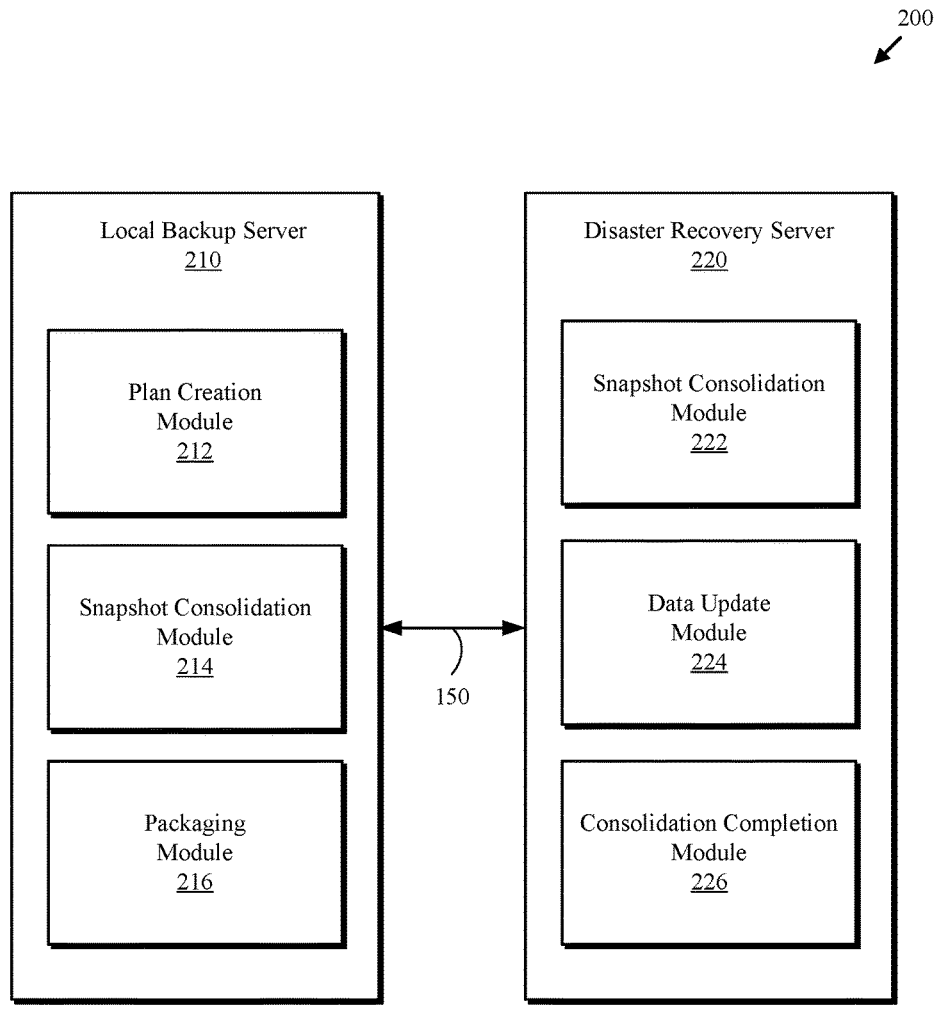
FIG. 2 is block diagram of a block-level backup system, in accordance with an embodiment of the present invention.

FIG. 2 is block diagram of a block-level backup system 200. As depicted, block-level backup system 200 includes local backup server 210 and disaster recovery server 220. Local backup server 210 and disaster recovery server 220 may be computing devices configured to receive and store backup data (e.g., a snapshot) from other computing devices. In one embodiment, local backup server 210 receives snapshots from one or more client devices (e.g., client computing devices 110 and 120 of FIG. 1), and disaster recovery server 220 receives snapshots from local backup server 210. In another embodiment, disaster recovery server 220 receives snapshots from multiple local backup servers dispersed throughout a network (e.g. network 150 of FIG. 1).

Over time, snapshots stored on local backup server 210 may become expired and have to be consolidated. In one embodiment, expired snapshots include snapshots that are older than a predefined retention period. In another embodiment, when a local backup server is running out of persistent storage, older snapshots are determined to be expired, in order to and recover a portion of the persistent storage. When a consolidation operation is invoked on local backup server 210, plan creation module 212 may be configured to scan expired snapshots and produce a merging plan. Snapshot consolidation module 214 may be configured to execute the merging plan, merging the expired snapshots and producing a consolidated snapshot.

Packaging module 216 receives requests for data. In one embodiment, the request for data is from disaster recovery server 220. In another embodiment, the request for data is from a client device such as client computing device 110 of FIG. 1. Packaging module 216 may be configured to retrieve the requested data, package data in a predefined format, and send the packaged data to the requester.

Disaster recovery server 220 may be a computing device configured to receive and store backup data from local backup server 210. Snapshot consolidation module 222 may be configured to perform snapshot consolidation on backup data stored on persistent storage corresponding to disaster recovery server 220 (e.g., persistent storage 162 of FIG. 1), using a merging plan generated by plan creation module 212. If data required for snapshot consolidation module 222 to complete is missing, the missing data is requested from the computing device that owns the data being consolidated (e.g., local backup server 210). Data update module 224 may be configured to receive, from local backup server 210, and distribute the missing data, allowing snapshot consolidation module 222 to complete. Consolidation completion module 226 may be configured to resolve, in non-expired snapshots, any remaining references to data in expired snapshots and recover any memory corresponding to the expired snapshots.

Figure 3:
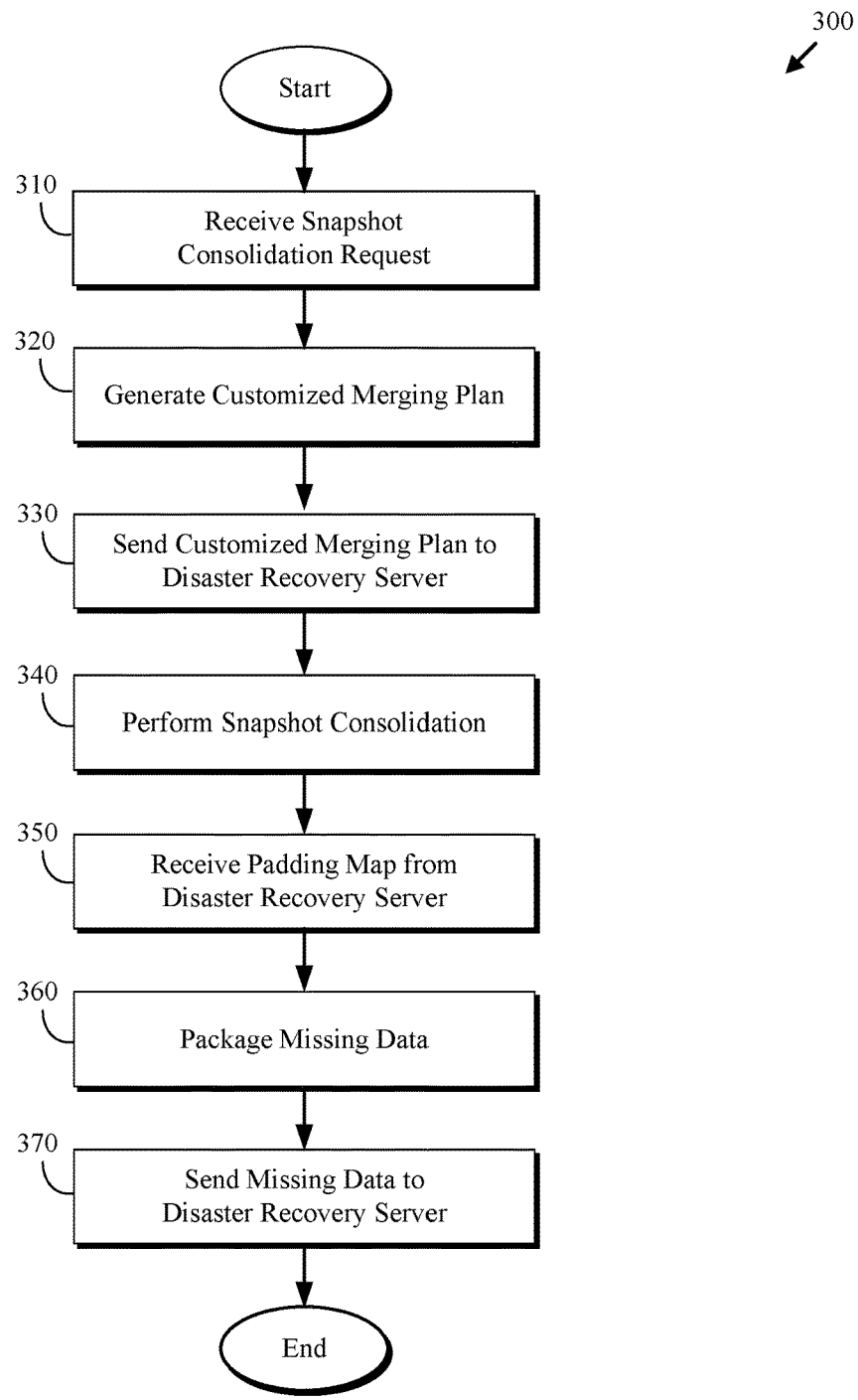
FIG. 3 is a flow chart depicting a snapshot consolidation method for a local backup server, in accordance with an embodiment of the present invention.

FIG. 3 is a flow chart depicting a snapshot consolidation method 300. As depicted, snapshot consolidation method 300 includes receiving (310) a snapshot consolidation request, generating (320) a customized merging plan, sending (330) the customized merging plan, performing (340) snapshot consolidation, receiving (350) a padding map, packaging (360) missing data, and sending (370) missing data. Snapshot consolidation method 300 may produce a new consolidated snapshot on a local backup server, and enable simultaneous synchronization of data stored on a disaster recovery server without transmitting the consolidated snapshot from the local backup server to the disaster recovery server.

Receiving (310) a snapshot consolidation request may include a local backup server (e.g., local backup server 130 of FIG. 1) receiving a request to initiate a snapshot consolidation of one or more expired snapshots stored on the persistent storage (e.g., persistent storage 132 of FIG. 1) corresponding to the local backup server. In some embodiments, a system administrator initiates the snapshot consolidation request. In other embodiments, a process runs at regular intervals and initiates the snapshot consolidation request.

Generating (320) a customized merging plan may include identifying all expired snapshots that are to be merged into a consolidated snapshot. The customized merging plan may be created by parsing the control files and data files from the expired snapshots, and generating a list of commands (also known as instructions) for renaming data files, copying data blocks, modifying control references, and deleting expired snapshots. In some embodiments, the customized merging plan is readable text that can be processed as multiple unique command line commands. In other embodiments, the customized merging plan is coded in a binary format, and runs as an application, executed similarly to a compiled application.

Sending (330) the customized merging plan may include transmitting the customized merging plan to a disaster recovery server, such as disaster recovery server 160 of FIG. 1. The merging plan may be transmitted over the network using methods familiar to those of skill in the art. In some embodiments, the local backup server transmits the customized merging plan to the disaster recovery server over a network using file transfer protocol secure (FTPS). In other embodiments, the local backup server transmits the customized merging plan to the disaster recovery server over a network using hypertext transfer protocol secure (HTTPS). Performing (340) snapshot consolidation may include utilizing the customized merging plan to consolidate all expired snapshots, producing a new consolidated snapshot on the local backup server. Entire data files corresponding to an expired snapshot may be renamed to correspond to the consolidated snapshot. Individual data blocks corresponding to an expired snapshot, but not part of a renamed data file, may be copied to the consolidated snapshot. If a control file within a non-expired snapshot contains references to data blocks in expired snapshots, the references to the expired snapshot may be modified to reference the consolidated snapshot. Expired snapshots may be deleted, allowing the local backup server to recover the storage corresponding to the expired snapshots.

Receiving (350) a padding map may include receiving, from a disaster recovery server, a request for missing data. The request for missing data may be in response to a snapshot consolidation corresponding to a customized merging plan produced by the generating operation (320). The structure and content of a padding map will be described in greater detail in the description of FIG. 9. In some embodiments, the information in the padding map includes information identifying individual missing data blocks. In other embodiments, the information in the padding map includes information identifying both missing data files and missing data blocks.

Packaging (360) missing data may include parsing through the padding map to identify what data is being requested. In some embodiments, the data is packaged as a list of data files and data blocks using the structure of a padding map. In other embodiments, the data is grouped into multiple packages, with each package corresponding to an individual snapshot. The packaging operation 360 provides missing data which may be sent to the requesting server.

Sending (370) missing data may include transmitting the packaged data data over a network from the local backup server to the disaster recovery server. The packaged missing data may be transmitted over the network using methods familiar to those of skill in the art. In some embodiments, the local backup server transmits the prepared data to the disaster recovery server over a network using file transfer protocol secure (FTPS). In another embodiment, the local backup server transmits the prepared data to the disaster recovery server over a network using hypertext transfer protocol secure (HTTPS).

Figure 4:
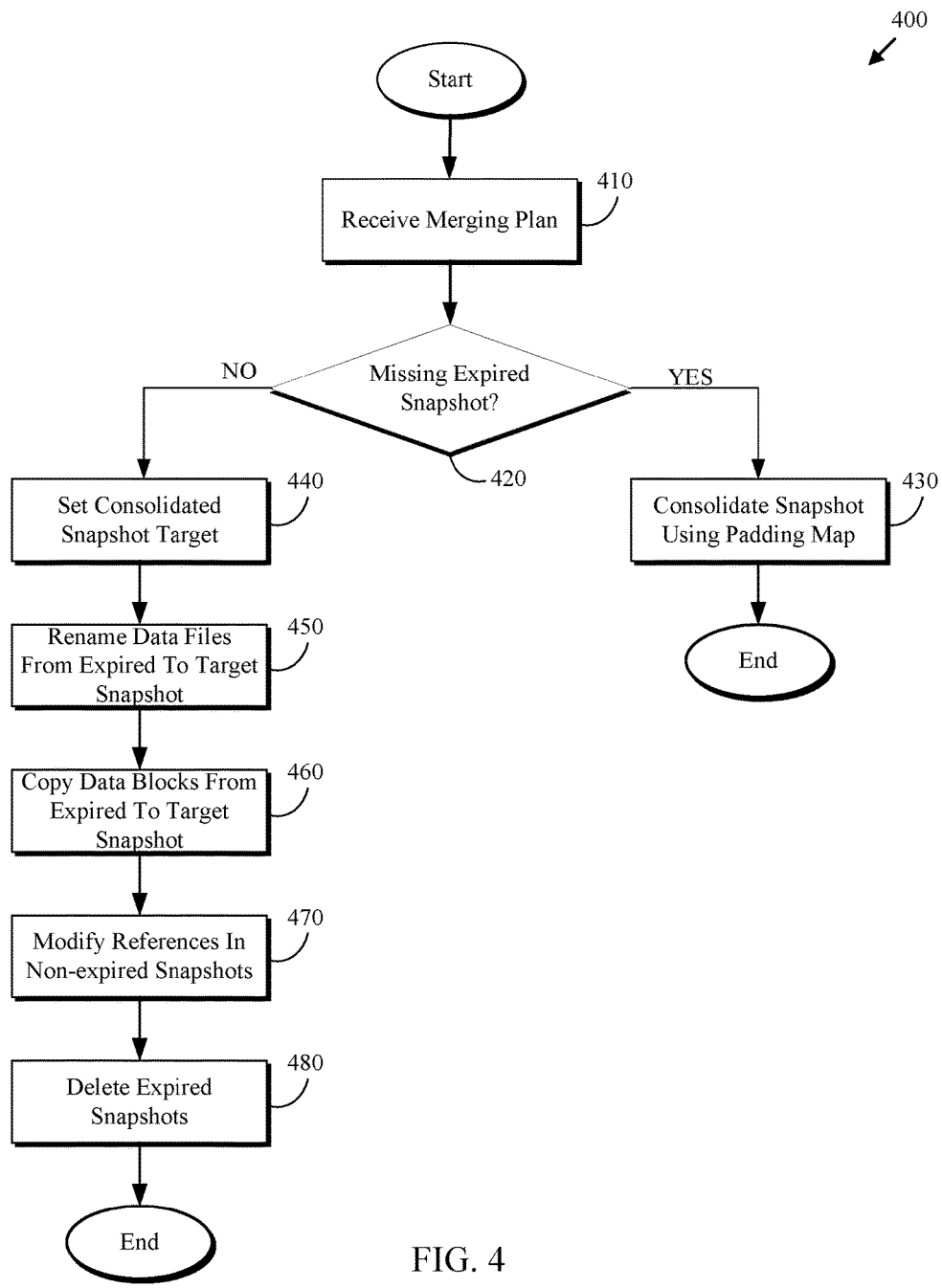
FIG. 4 is a flow chart depicting a snapshot consolidation method for a disaster recovery server, in accordance with an embodiment of the present invention.

FIG. 4 is a flow chart depicting a snapshot consolidation method 400. As depicted, snapshot consolidation method 400 includes receiving (410) a merging plan, determining (420) whether any expired snapshots are missing, consolidating (430) using a padding map, setting (440) a consolidated snapshot target, renaming (450) data files, copying (460) data blocks, updating (470) references, and deleting (480) expired snapshots. Snapshot consolidation method 400 enables a disaster recovery server to perform snapshot consolidation, producing a consolidated snapshot that is synchronized with a consolidated snapshot on a local backup server.

Receiving (410) a merging plan may include the disaster recovery server receiving a merging plan from a local backup server. The merging plan may include detailed instructions enabling a snapshot consolidation on the disaster recovery server. In some embodiments, receiving a merging plan initiates a snapshot consolidation operation on the disaster recovery server. In other embodiments, a snapshot consolidation on the disaster recovery server is manually initiated and the merging is provided as parameter on the request.

Determining (420) whether any expired snapshots are missing may include parsing the contents of the merging plan to determine which snapshots on the local backup server are included in the snapshot consolidation, producing a list of expired snapshots. If the disaster recovery server is missing any of the snapshots included in the list of expired snapshots, then the Snapshot consolidation method 400 proceeds to consolidating (430) using a padding map. Otherwise, the method proceeds to setting (440) a consolidated snapshot target.

Consolidating (430) using a padding map may include enabling snapshot consolidation on the disaster recovery server while managing and accounting for missing data during the consolidation operation. Snapshot consolidation, including handling missing data and the use of a padding map, will be described in further detail in the description of FIG. 5.

Setting (440) a consolidated snapshot target may include parsing the contents of the merging plan to identify which snapshot is the target of the consolidation. The target of the snapshot consolidation is a snapshot to which all subsequent expired snapshots may be merged. In some embodiments, the target of the snapshot consolidation is explicitly identified in the merging plan. In other embodiments, the target of the snapshot consolidation is identified in the merging plan as the newest expired snapshot (i.e., the snapshot that was most recently created).

Renaming (450) data files may include parsing the contents of the merging plan to identify each rename instruction included in the merging plan. Execution of a rename instruction may result in a data file corresponding to an expired snapshot being renamed to correspond to the consolidated snapshot. Copying (460) data blocks may include parsing the contents of the merging plan to identify each copy instruction included in the merging plan. Execution of a copy instruction may result in a data block that is included in an expired snapshot, being copied to the consolidated snapshot.

Modifying (470) references may include modifying references in a snapshot control file. Associated with a snapshot, there may be a control file corresponding to a data file. The control file may contain a reference identifying which snapshot contains the most recently updated data corresponding to a data block. If the reference in the control file corresponds to an expired snapshot, then the reference may be modified to indicate the newly consolidated snapshot.

Deleting (480) expired snapshots may include deleting expired snapshots and freeing up the storage for use by the disaster recovery server. In some embodiments, deleting expired snapshots frees up persistent storage, such as persistent storage 162 corresponding to disaster recovery server 160 as depicted in FIG. 1. Freeing up persistent storage provides additional persistent storage for use by future backup operations.

Figure 5:
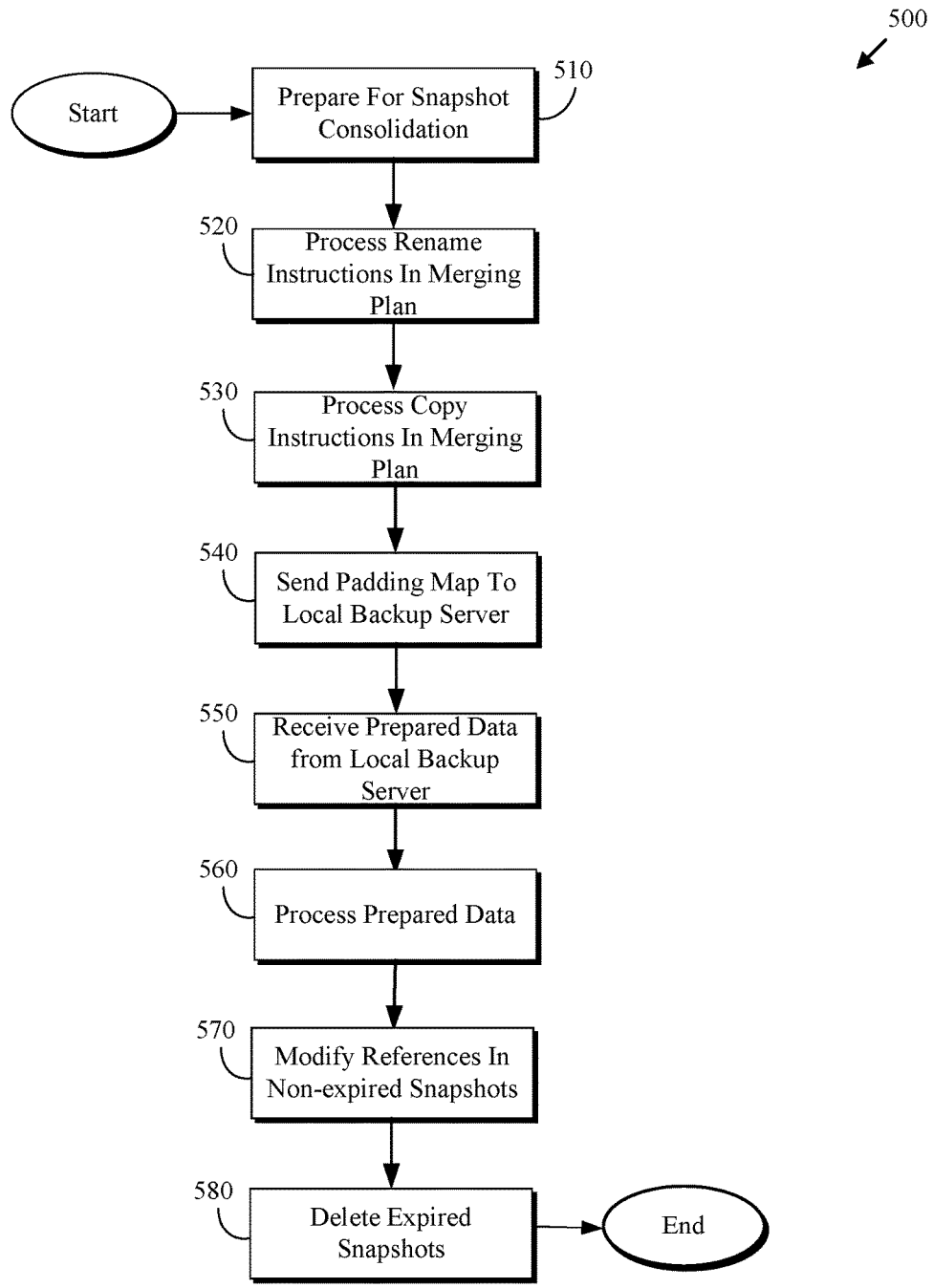
FIG. 5 is a flow chart depicting a method for snapshot consolidation using a padding map, in accordance with an embodiment of the present invention.

FIG. 5 is a flow chart depicting a padding map consolidation method 500. As depicted, padding map consolidation method 500 includes preparing (510) for snapshot consolidation, processing (520) rename instructions in the merging plan, processing (530) copy instructions in the merging plan, sending (540) a padding map to a local backup server, receiving (550) prepared data from a local backup server, processing (560) prepared data, modifying (570) references in non-expired snapshots, and deleting (580) expired snapshots. Padding map consolidation method 500 enables snapshot consolidation using a merging plan by tacking missing data using padding blocks and a padding map.

Preparing (510) for snapshot consolidation may include identifying the snapshot that is to be the target of the consolidation. The target of the snapshot consolidation is a snapshot to which all subsequent expired snapshots may be merged. In some embodiments, the consolidated snapshot target is specifically identified in the merging plan. In other embodiments, the consolidated snapshot target is identified in the merging plan as the newest expired snapshot (i.e., the snapshot that was most recently created). Additionally, a padding map may be created to be used when identifying and tracking missing data throughout the snapshot consolidation operation. In one embodiment, the padding map is an empty file. In another embodiment, the padding map is created with entries indicating each expired snapshot that is not present on the disaster recovery server.

Processing (520) rename instructions in the merging plan may include executing rename instructions included in the merging plan. Additional detail of renaming process 520 will be provided in the description of FIG. 6.

Processing (530) copy instructions in the merging plan may include executing copy instructions included in the merging plan. Additional detail of copying process 530 will be provided in the description of FIG. 7.

Sending (540) a padding map to a local backup server may include transmitting the padding map to a local backup server, such as local backup server 130 of FIG. 1. Transmitting the padding map to the local backup server may be a means of requesting, from the local backup server, missing data required for the snapshot consolidation to complete on the disaster recovery server. The padding map may be transmitted over the network using methods familiar to those of skill in the art. In some embodiments, the disaster recovery server transmits the padding map to the local backup server over a network using file transfer protocol secure (FTPS). In another embodiments, the disaster recovery server transmits the padding map to the local backup server over a network using hypertext transfer protocol secure (HTTPS).

Receiving (550) prepared data from a local backup server may include prepared data corresponding to the missing data required for the snapshot consolidation to complete on the disaster recovery server. In some embodiments, the prepared data may be a list of data files and data blocks using the structure of a padding map as described in FIG. 9. In other embodiments, the data may be received in individual packages, each corresponding to an individual snapshot.

Processing (560) prepared data may include parsing through the prepared data, and positioning the data in its proper location within the consolidated snapshot on the disaster recovery server. Additional details of processing operation 560 will be provided in the description of FIG. 8.

Modifying (570) references in non-expired snapshots may include scanning the control files corresponding to non-expired snapshots searching for references to expired snapshots. A reference to an expired snapshot may be modified to reference the newly created consolidated snapshot.

Deleting (580) expired snapshots may include deleting expired snapshots and freeing up storage for future use by the disaster recovery server. In some embodiments, deleting expired snapshots frees up persistent storage, such as persistent storage 162 corresponding to disaster recovery server 160 as depicted in FIG. 1, providing additional persistent storage for use by future backup operations.

Figure 6:
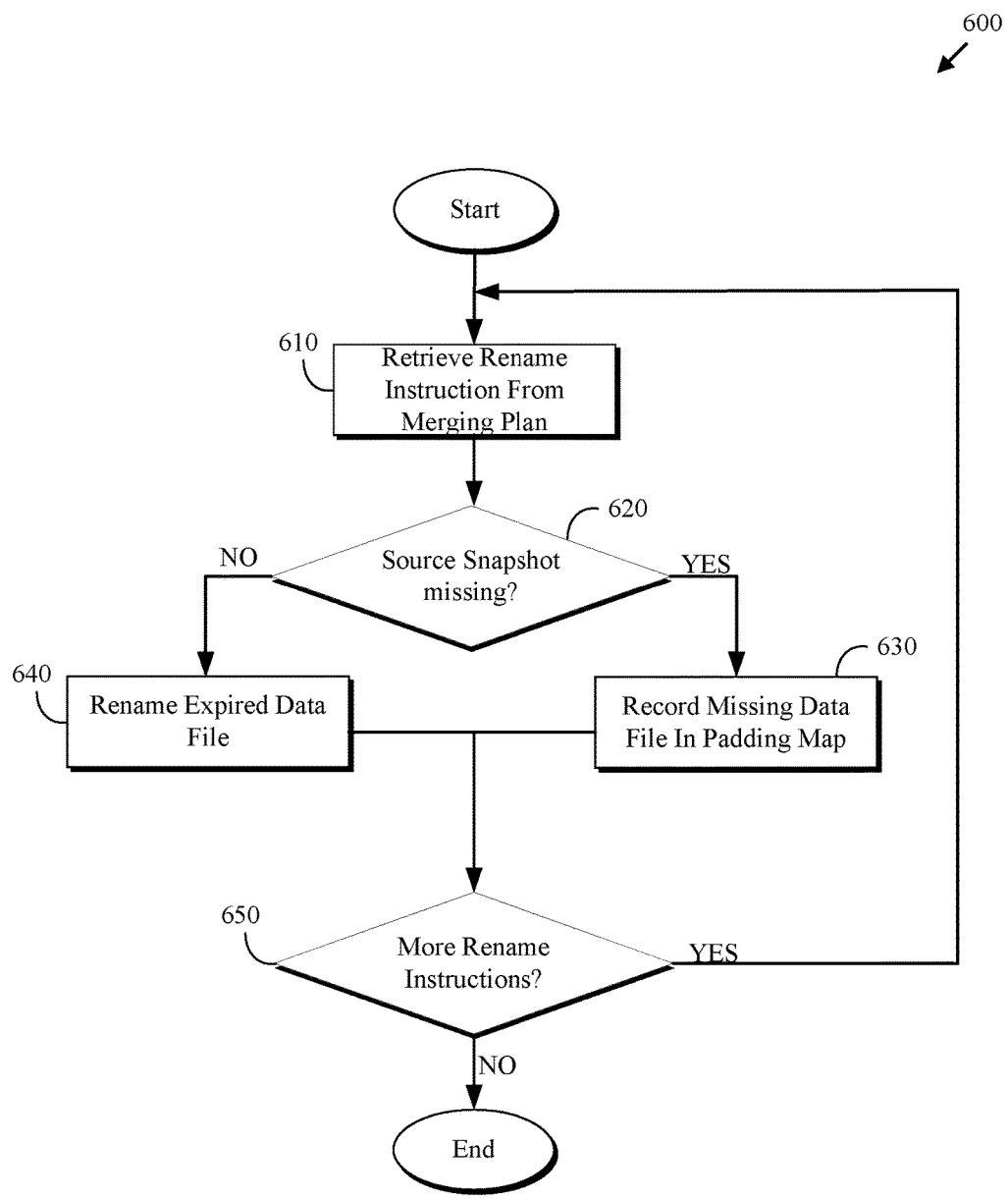
FIG. 6 is a flow chart depicting a method for processing rename instructions corresponding to a merging plan, in accordance with an embodiment of the present invention.

FIG. 6 is a flow chart depicting a rename method 600. As depicted, rename method 600 includes retrieving (610) a rename instruction, determining (620) whether the source snapshot is missing, recording (630) a missing data file in the padding map, renaming (640) an expired data file, and determining (650) whether there are more rename instructions. Rename method 600 enables processing of rename instructions identified in a merging plan by using a padding map to track missing data files that may prevent a rename instruction from executing.

Retrieving (610) a rename instruction may include parsing through the merging plan, and searching for rename instructions. The purpose of the rename instruction may be to rename an expired data file so that the data file corresponds to the newly consolidated snapshot. In some embodiments, the entire contents of the merging plan are parsed, producing a collection of all rename instructions included in the merging plan. In other embodiments, the merging plan is parsed, and each rename instruction is processed as soon as the rename instruction is encountered during the parsing process.

Determining (620) whether the source snapshot is missing may include discovering the snapshot identified as the source of the rename instruction, and verifying whether the source snapshot is present in the current backup. In some embodiments, a snapshot is a directory on the file system, and the existence of a snapshot can be verified using the file system API. If the source snapshot is missing, rename method 600 proceeds to recording (630) a missing data file in the padding map. Otherwise, the method 600 proceeds to renaming (640) an expired data file.

Recording (630) a missing data file in the padding map may include creating a padding map entry identifying the missing data file. The entry may identify the missing snapshot as well as the missing data file. A padding map will be described in greater detail in the description of FIG. 9. If the source data file of the rename instruction is missing, the rename instruction may be unable to execute, and is postponed until the missing data file is available.

Renaming (640) an expired data file may include executing a rename instruction that has been retrieved from the merging plan. The rename instruction may rename a data file, corresponding to an expired snapshot, such that after the rename instruction has completed execution, the data file corresponds to the newly consolidated snapshot.

Determining (650) whether there are more rename instructions may include verifying if all rename instructions included in the merging plan have been processed. In some embodiments, a collection of rename instructions is produced from the merging plan, and once each instruction in the collection has been processed, there are no more rename instructions remaining to be processed. In other embodiments, the merging plan is parsed, processing rename instructions as they are encountered, and upon reaching the end of the merging plan, no more rename instructions remain to be processed. If there are more rename instructions to be processed, rename method 600 iterates to retrieving (610) a rename instruction. Otherwise method 600 terminates.

Figure 7:
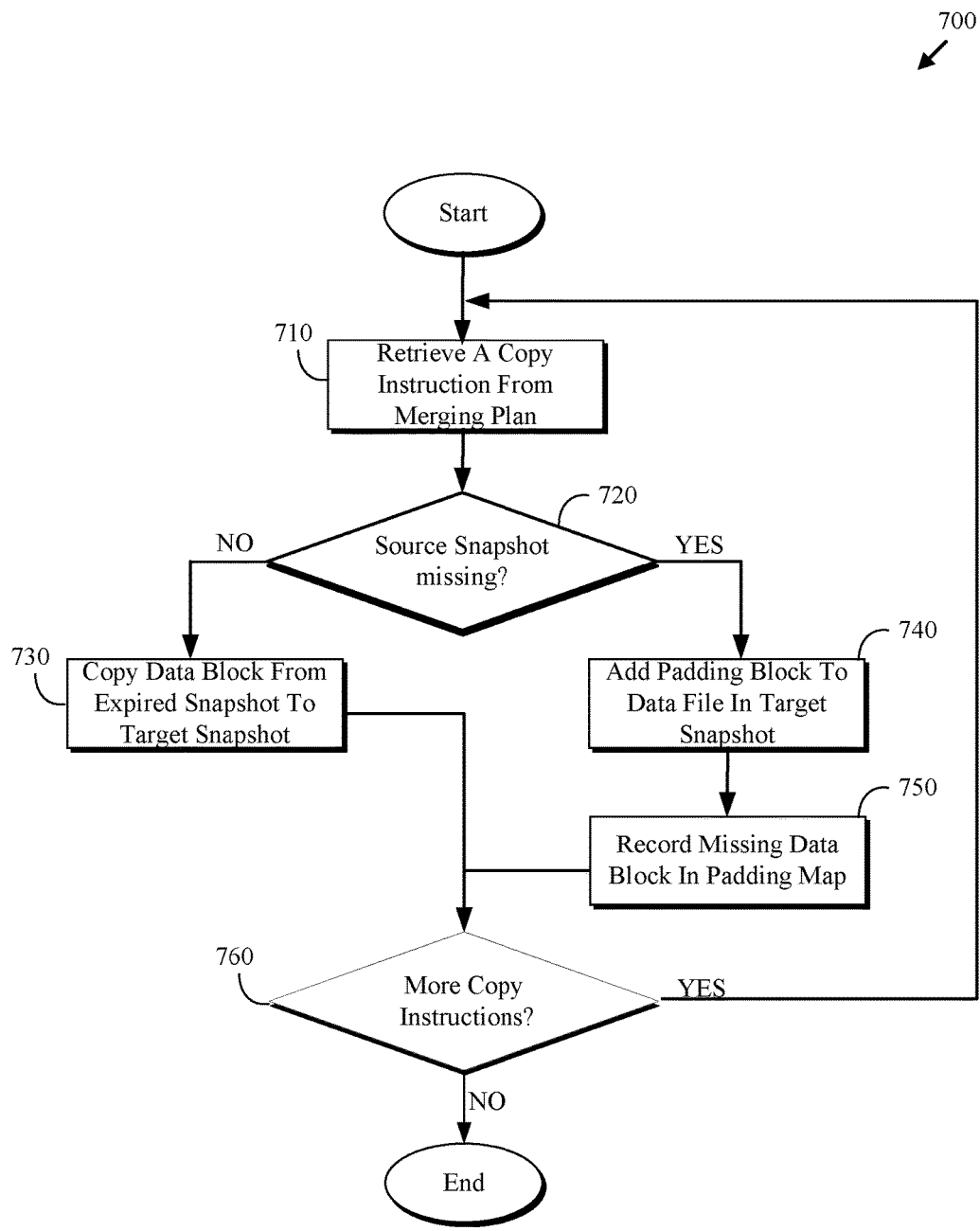
FIG. 7 is a flow chart depicting a method for processing copy instructions corresponding to a merging plan, in accordance with an embodiment of the present invention.

FIG. 7 is a flow chart depicting a copy method 700. As depicted, copy method 700 includes retrieving (710) a copy instruction, determining (720) whether the source snapshot is missing, copying (730) expired data block, adding (740) a padding block, recording (750) a missing data block in the padding map, and determining (760) whether there are more copy instructions. Copy method 700 enables processing of copy instructions identified in a merging plan by using padding blocks and a padding map to track missing data blocks that may prevent a copy instruction from executing.

Retrieving (710) a copy instruction may include parsing through the merging plan, and searching for copy instructions. The purpose of the copy instruction may be to copy an expired data block from an expired snapshot to the consolidated snapshot. In some embodiments, the entire contents of the merging plan are parsed, producing a collection of all copy instructions included in the merging plan. In other embodiments, the merging plan is parsed, and each copy instruction is processed as soon as the copy instruction is encountered during the parsing process.

Determining (720) whether the source snapshot is missing may include discovering the snapshot identified as the source of the copy instruction, and verifying whether the source snapshot is present in the current backup. In some embodiments, a snapshot is a directory on the file system, and the existence of a snapshot can be verified using the file system API. If the source snapshot is missing, copy method 700 proceeds to adding (740) a padding block. Otherwise, the method 700 proceeds to copying (730) expired data block.

Copying (730) expired data block may include executing a copy instruction that has been retrieved from the merging plan. If not all data blocks in a data file are to be consolidated, then individual data blocks may be copied to the consolidated snapshot. The copy instruction may copy a data block, corresponding to an expired snapshot to the newly consolidated snapshot, such that after the copy instruction has completed execution, the data block is no longer considered expired.

Adding (740) a padding block may include reserving space, in the newly consolidated snapshot, for a missing data block. The size of a data block may be a predefined quantity of storage (e.g., 50 MB) and therefore an empty block of storage (i.e, a padding block) is included in the consolidated snapshot in the location the data may be placed when it is available. In some embodiments, the use of a padding block may keep the data in logical order in storage, and result in reduced access times when preforming recovery operations (i.e., increased performance).

Recording (750) a missing data block in a padding map may include creating a padding map entry identifying the missing data block. The padding map entry may identify the missing snapshot as well as the missing data file and a specific missing data block. A padding map will be described in greater detail in the description of FIG. 9. If the source data block of the copy instruction is missing, the copy instruction may be unable to execute, and is postponed until the missing data block is available.

Determining (760) whether there are more copy instructions may include verifying if all copy instructions included in the merging plan have been processed. In some embodiments, a collection of copy instructions is produced from the merging plan, and once each instruction in the collection has been processed, there are no more copy instructions remaining to be processed. In other embodiments, the merging plan is parsed, processing copy instructions as they are encountered, and upon reaching the end of the merging plan, no more copy instructions remain to be processed. If there are more copy instructions to be processed, copy method 700 iterates to retrieving (710) a copy instruction. Otherwise method 700 terminates.

Figure 8:
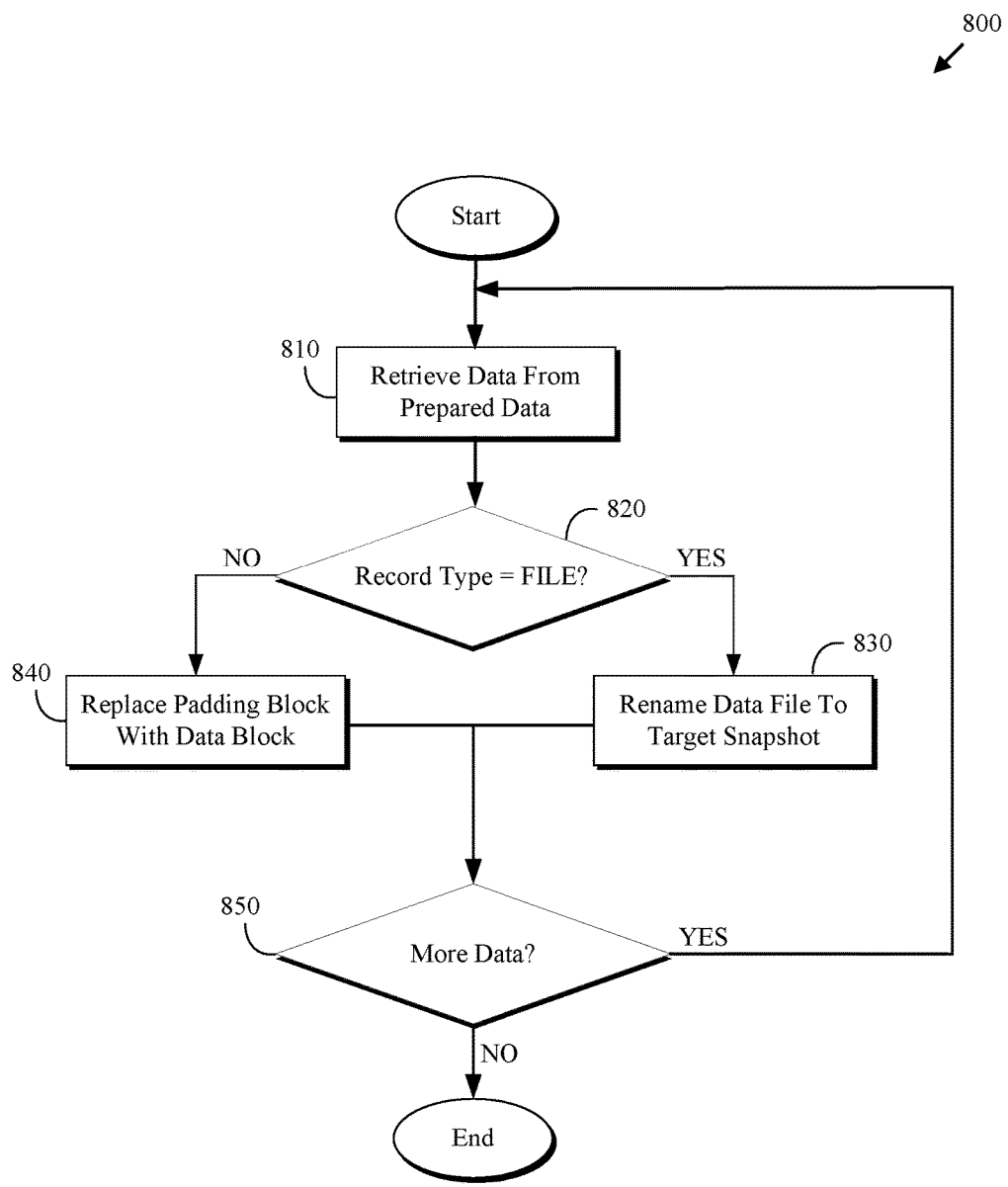
FIG. 8 is a flow chart depicting a method for processing prepared data, in accordance with an embodiment of the present invention.

FIG. 8 is a flow chart depicting a prepared data processing method 800. As depicted, prepared data processing method 800 includes retrieving (810) data from the prepared data, determining (820) whether the record type is 'FILE', renaming (830) a data file to the target snapshot, replacing (840) a padding block with a data block, and determining (850) whether there is more data. Prepared data processing method 800 enables the insertion of missing data into a consolidated snapshot.

Retrieving (810) data from the prepared data may include receiving prepared data from a local backup server. In some embodiments, the data may be packaged as a list of data files and data blocks using the structure of a padding map. In other embodiments, the data is be grouped in multiple packages, with each package corresponding to an individual snapshot. The individual data items may be retrieved from the prepared data by parsing through the prepared data. Each individual data item may contain a data_file_info control block that identifies the type of data and where the data came from.

Determining (820) whether the record type is 'FILE' may include retrieving a record type value from the data_file_info control block. If the record type is 'FILE', then prepared data processing method 800 proceeds to renaming (830) a data file to the target snapshot. Otherwise, the record type is 'BLOCK', and the method 800 proceeds replacing (840) a padding block with a data block.

Renaming (830) a data file to the target snapshot may include processing a rename instruction that was postponed during rename method 600. During rename method 600, a rename instruction may have been postponed because a data file being renamed was not available on the disaster recovery server. The missing data file may be in the prepared data, and the postponed rename instruction may be able to successfully execute.

Replacing (840) a padding block with a data block may include processing a copy instruction that was postponed during copy method 700. During copy method 700 a copy instruction may have been postponed because a data block being copied to the consolidated snapshot was not available on the disaster recovery server. The missing data block may be in the prepared data, and the postponed copy instruction may be able to successfully execute, effectively replacing the empty padding block with the data block from the prepared data.

Determining (850) whether there is more data may include parsing through and processing each missing snapshot entry identified in the prepared data. If additional missing snapshot entries exist in the prepared data, then there is more data to be processed and prepared data processing method 800 iterates to retrieving (810) data from the prepared data. Otherwise, the method 800 terminates.

Figure 9:
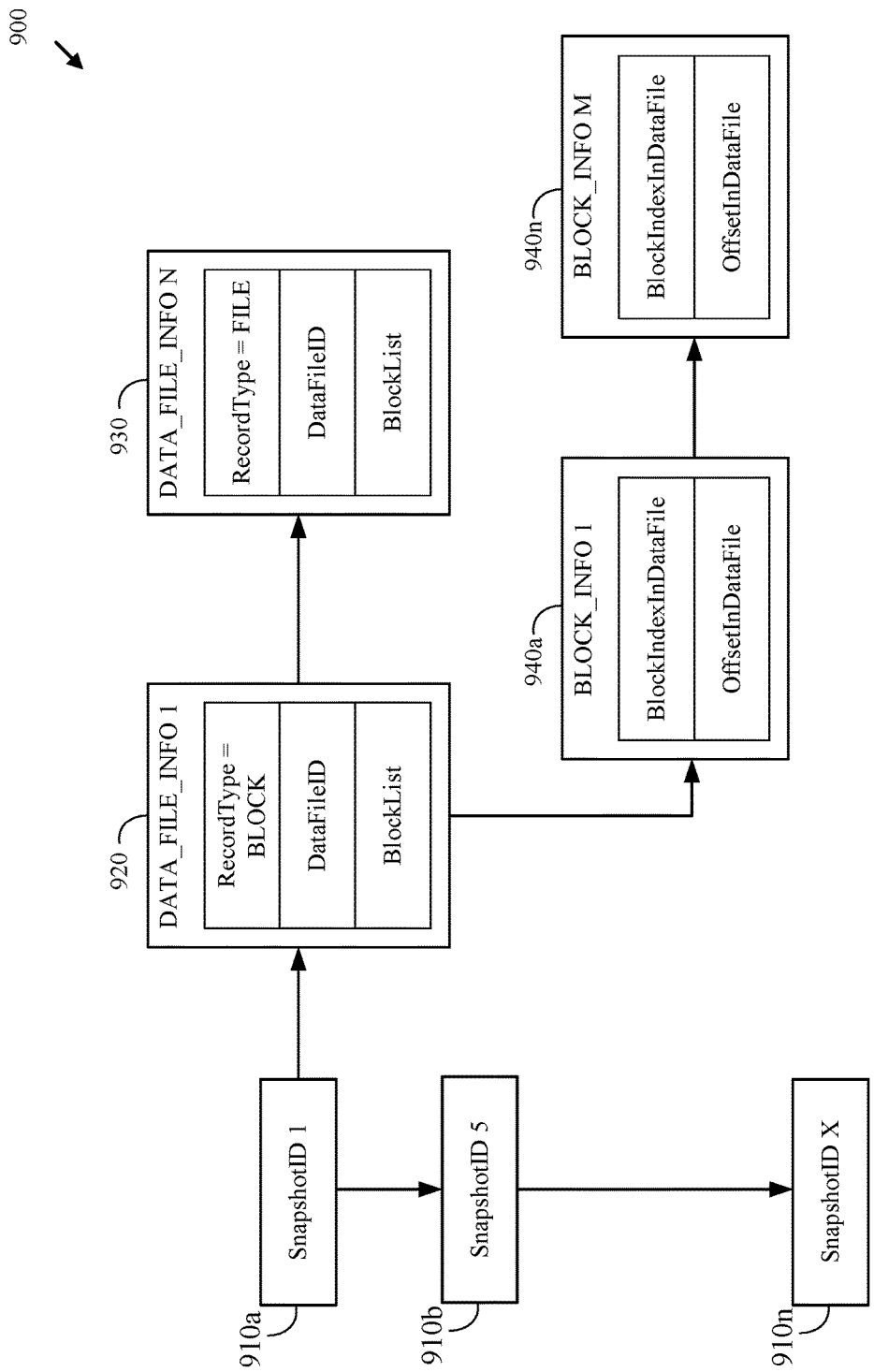
FIG. 9 is a block diagram of a padding map, in accordance with an embodiment of the present invention.

FIG. 9 is a block diagram of one embodiment of a padding map 900. As depicted, padding map 900 includes a list of snapshotIDs (i.e., 910*a*, 910*b*, and 910*n*) that may identify a missing snapshot on a disaster recovery server. Each snapshotID may have associated with it one or more data_file_info objects (920 and 930). A data_file_info object references data corresponding to the snapshot identified by shapshotID. A data_file_info object with a RecordType identifier of BLOCK (e.g., 920) may reference one or more individual data blocks (e.g., 940*a* and 940*n*) within a data file. A data_file_info object with a RecordType identifier of FILE (e.g., 930) may reference an entire data file. In some embodiments, a padding map produced by a disaster recovery server includes references to snapshots, data files, and data blocks which identify data missing from on the disaster recovery server. In other embodiments, a padding map provided by a local backup server includes the data identified by snapshot, data file, and data block references.

FIG. 10 is a diagram depicting one embodiment of example merging plan 1000. As depicted, example merging plan 1000 is a readable text file that may be generated by parsing control files from expired snapshots a through j on a local backup server and generating a list of instructions. The generated list of instructions (i.e., the merging plan) may include the instructions to perform a snapshot consolidation for the local backup server on which the merging plan was generated. Example merging plan 1000 includes instructions to rename data files (1010*a* and 1010*b*), copy data blocks (1020*a* and 1020*b*), modify references in a control file (1030*a* and 1030*b*), and delete expired snapshots (1040*a* and 1040*b*).

In the current embodiment, when all blocks in a data file come from the same snapshot expired, the data file can be renamed using the RenameFile instruction (1010*a* and 1010*b*). Otherwise, data blocks in the data file that come from the expired snapshot may be copied using the CopyBlock instruction (1020*a* and 1020*b*). After all data has been consolidated, references to any expired snapshot that are contained in non-expired snapshot may be updated to refer to the consolidated full snapshot using the ModifyReference instruction (1030*a* and 1030*b*). To recover the storage used by the expired snapshots, all files corresponding to expired snapshots that have been consolidated may be deleted using the DeleteFile instruction (1040*a* and 1040*b*). Successful execution of the instructions in the merging plan may produce a consolidated snapshot on the local backup server.

Figure 11:
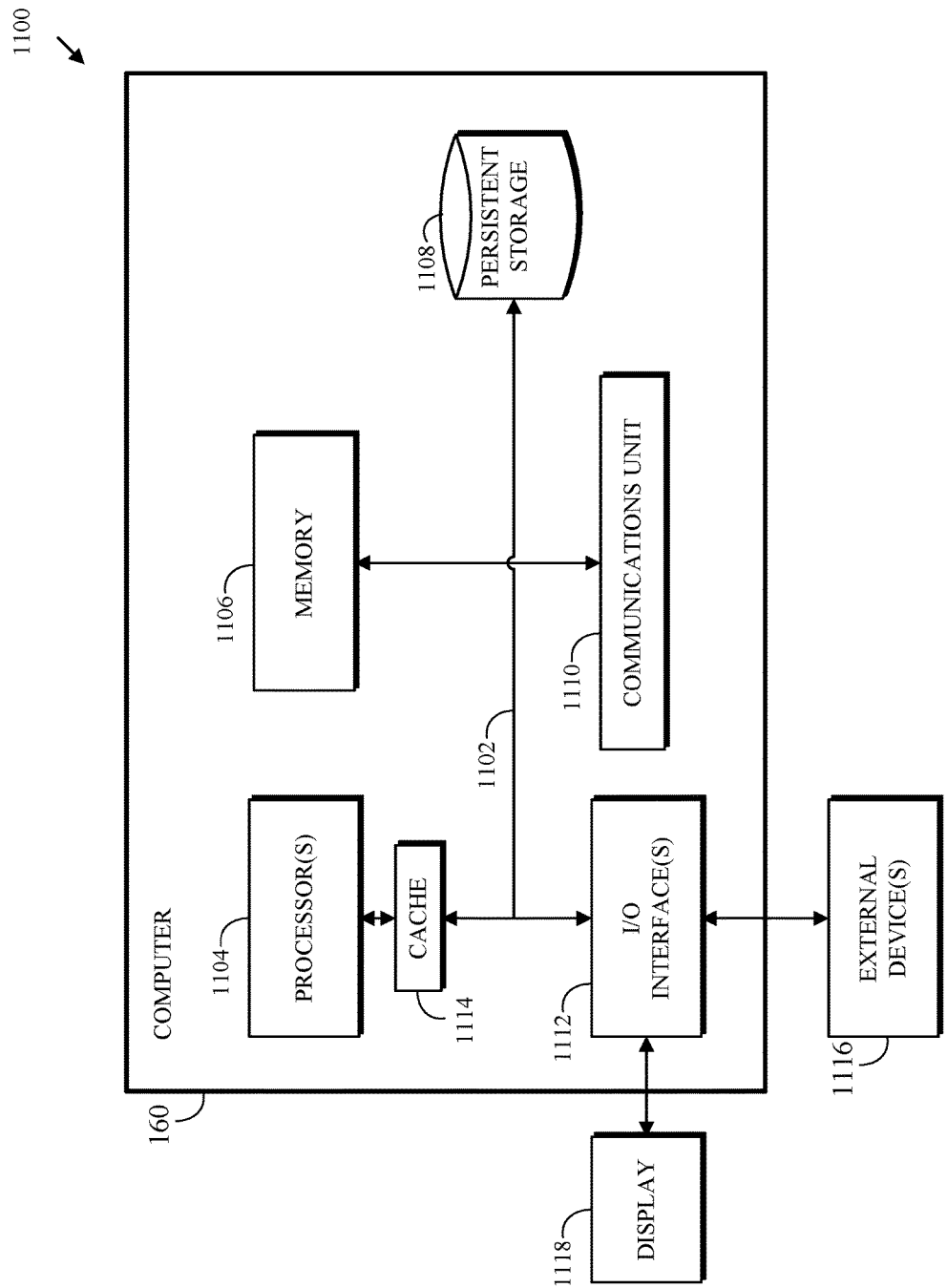
FIG. 11 is a block diagram depicting various components of one embodiment of a computer suitable for executing the methods disclosed herein, in accordance with an embodiment of the present invention.

FIG. 11 depicts a block diagram of components of a computer system 1100, which is an example of a system such as disaster recovery server 160 within distributed data processing environment 100 of FIG. 1, in accordance with an embodiment of the present invention. It should be appreciated that FIG. 11 provides only an illustration of one implementation and does not imply any limitations with regard to the environments in which different embodiments can be implemented. Many modifications to the depicted environment can be made.

Disaster recovery server 160 includes processor(s) 1104, cache 1114, memory 1106, persistent storage 1108, communications unit 1110, input/output (I/O) interface(s) 1112 and communications fabric 1102. Communications fabric 1102 provides communications between cache 1114, memory 1106, persistent storage 1108, communications unit 1110, and input/output (I/O) interface(s) 1112. Communications fabric 1102 can be implemented with any architecture designed for passing data and/or control information between processors (such as microprocessors, communications and network processors, etc.), system memory, peripheral devices, and any other hardware components within a system. For example, communications fabric 1102 can be implemented with one or more buses.

Memory 1106 and persistent storage 1108 are computer readable storage media. In this embodiment, memory 1106 includes random access memory (RAM). In general, memory 1106 can include any suitable volatile or non-volatile computer readable storage media. Cache 1114 is a fast memory that enhances the performance of processor(s) 1104 by holding recently accessed data, and data near recently accessed data, from memory 1106.

Program instructions and data used to practice embodiments of the present invention, e.g., snapshot consolidation method 300 and snapshot consolidation method 400, are stored in persistent storage 1108 for execution and/or access by one or more of the respective processor(s) 1104 via cache 1114. In this embodiment, persistent storage 1108 includes a magnetic hard disk drive. Alternatively, or in addition to a magnetic hard disk drive, persistent storage 1108 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1108 may also be removable. For example, a removable hard drive may be used for persistent storage 1108. Other examples include optical and magnetic disks, thumb drives, and smart cards that are inserted into a drive for transfer onto another computer readable storage medium that is also part of persistent storage 1108.

Communications unit 1110, in these examples, provides for communications with other data processing systems or devices, including resources of disaster recovery server 160. In these examples, communications unit 1110 includes one or more network interface cards. Communications unit 1110 may provide communications through the use of either or both physical and wireless communications links. Program instructions and data used to practice embodiments of snapshot consolidation method 300 and snapshot consolidation method 400 may be downloaded to persistent storage 1108 through communications unit 1110.

I/O interface(s) 1112 allows for input and output of data with other devices that may be connected to each computer system. For example, I/O interface(s) 1112 may provide a connection to external device(s) 1116 such as a keyboard, a keypad, a touch screen, a microphone, a digital camera, and/or some other suitable input device. External device(s) 1116 can also include portable computer readable storage media such as, for example, thumb drives, portable optical or magnetic disks, and memory cards. Software and data used to practice embodiments of the present invention can be stored on such portable computer readable storage media and can be loaded onto persistent storage 1108 via I/O interface(s) 1112. I/O interface(s) 1112 also connect to a display 1118.

Display 1118 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, executed by a computer, the method comprising:

receiving a customized merging plan;

creating a padding map comprising missing data information;

sending the padding map to a local backup server to request missing data;

receiving from the local backup server, the missing data;

performing a snapshot consolidation according to the customized merging plan to provide a consolidated snapshot; and copying a data block from an expired snapshot to the consolidated snapshot, wherein space for a missing data block is reserved with a padding block, and the missing data block is recorded in the padding map.

2. The method of claim 1, wherein the missing data comprises missing data files.

3. The method of claim 1, wherein the missing data comprises missing data blocks.

4. The method of claim 1, further comprising modifying references to expired snapshots in control files corresponding to non-expired snapshots.

5. The method of claim 1, further comprising deleting expired snapshots.

6. The method of claim 1, further comprising replacing the padding block with a corresponding data block retrieved from the missing data.

* * * * *